US012715310B2

(12) United States Patent
Hendrickson et al.

(10) Patent No.: US 12,715,310 B2
(45) Date of Patent: Aug. 25, 2026

(54) ELECTRICAL ARCHITECTURE FOR BATTERY POWERED MACHINE

(71) Applicant: Caterpillar Inc., Peoria, IL (US)

(72) Inventors: Matthew Lawrence Hendrickson, Dunlap, IL (US); Eric M. Andris, Dunlap, IL (US); Dustin Craig Selvey, Eureka, IL (US); Bradley Scott Bailey, Edwards, IL (US); Igor Strashny, Tucson, AZ (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 19/182,697

(22) Filed: Apr. 18, 2025

(65) Prior Publication Data

US 2025/0242703 A1 Jul. 31, 2025

Related U.S. Application Data

(63) Continuation of application No. 17/981,849, filed on Nov. 7, 2022, now Pat. No. 12,304,329.

(51) Int. Cl.

| | |
|---|---|
| ***B60L 50/53*** | (2019.01) |
| ***B60L 9/00*** | (2019.01) |
| ***B60L 53/10*** | (2019.01) |
| ***B60L 53/22*** | (2019.01) |
| *B60L 1/00* | (2006.01) |
| *B60L 1/02* | (2006.01) |
| *H02J 1/082* | (2026.01) |
| *H02J 105/37* | (2026.01) |

(52) U.S. Cl.

CPC ................ *B60L 50/53* (2019.02); *B60L 9/00* (2013.01); *B60L 53/11* (2019.02); *B60L 53/22* (2019.02); *B60L 1/003* (2013.01); *B60L 1/02* (2013.01); *B60L 2200/40* (2013.01); *B60L 2210/10* (2013.01); *H02J 1/082* (2020.01); *H02J 2105/37* (2026.01)

(58) Field of Classification Search

CPC ................ B60L 50/53; B60L 2200/36; B60L 2200/40–44; H02J 1/082; H02J 2310/48

See application file for complete search history.

(56) References Cited

U.S. PATENT DOCUMENTS

| | | | | |
|---|---|---|---|---|
| 2007/0103002 | A1 * | 5/2007 | Chiao | B60K 6/46 307/10.1 |
| 2009/0033148 | A1 * | 2/2009 | Hoff | B60K 6/46 307/10.1 |
| 2018/0312077 | A1 * | 11/2018 | Kondo | B60R 16/033 |
| 2021/0062471 | A1 * | 3/2021 | Kaneda | E02F 9/2235 |

(Continued)

FOREIGN PATENT DOCUMENTS

| | | | | |
|---|---|---|---|---|
| JP | 2005237125 A * | 9/2005 | | |
| WO | WO-2023112945 A1 * | 6/2023 | | B60L 5/28 |

OTHER PUBLICATIONS

English machine translation of JP2005237125A published Sep. 2, 2005 (Year: 2005).*

(Continued)

*Primary Examiner* — Rexford N Barnie
*Assistant Examiner* — David A Shiao

(57) ABSTRACT

An electrical architecture that allows power to be transferred to a battery powered machine while the machine is moving and that allows the machine to be charged while stationary.

14 Claims, 4 Drawing Sheets

(56) References Cited

U.S. PATENT DOCUMENTS

| | | | | |
|---|---|---|---|---|
| 2023/0299609 | A1 * | 9/2023 | Wu | B60L 50/40 320/166 |
| 2024/0149717 | A1 | 5/2024 | Hendrickson et al. | |
| 2024/0150999 | A1 * | 5/2024 | Takeo | E02F 9/207 |
| 2024/0399932 | A1 * | 12/2024 | Hoshino | B60L 7/22 |
| 2025/0050750 | A1 * | 2/2025 | Watanabe | B60L 50/53 |

OTHER PUBLICATIONS

English machine translation of WO2023112945A1 published Jun. 22, 2023 (Year: 2023).*

"U.S. Appl. No. 17/981,849, Non Final Office Action mailed Aug. 13, 2024", 11 pgs.

"U.S. Appl. No. 17/981,849, Response filed Sep. 30, 2024 to Non Final Office Action mailed Aug. 13, 2024", 10 pgs.

"U.S. Appl. No. 17/981,849, Final Office Action mailed Oct. 24, 2024", 13 pgs.

"U.S. Appl. No. 17/981,849, Response filed Dec. 2, 2024 to Final Office Action mailed Oct. 24, 2024", 11 pgs.

"U.S. Appl. No. 17/981,849, Notice of Allowance mailed Jan. 23, 2025", 13 pgs.

* cited by examiner

ELECTRICAL ARCHITECTURE FOR BATTERY POWERED MACHINE

CLAIM OF PRIORITY

This application is a continuation of U.S. patent application Ser. No. 17/981,849, filed on Nov. 7, 2022, the benefit of priority of which is claimed hereby, and which is incorporated by reference herein in its entirety.

TECHNICAL FIELD

This document relates generally to battery powered machines and, more particularly, to an architecture for an electrical system for battery powered machines.

BACKGROUND

In response to fuel efficiency concerns and desired performance characteristics, an emphasis has been placed on using electrical power to operate various components associated with a vehicle. Battery powered machines provide many advantages over combustion engine machines. One advantage is that battery powered machines do not emit combustion byproducts. This advantage is particularly useful in underground mining environments. A combustion-engine underground-mining machine may often need to be paired with ventilation systems that provide fresh air to the machine and that carry away the combustion exhaust above-ground One problem faced by battery powered machines results from the different power level requirements of the various electrically powered elements. Certain applications may require two or more power sources having different power level outputs to meet the needs of the electrical elements. Further, electrical buses for segregating the different power levels and for supplying power to the electrical elements may also be necessary.

U.S. Pat. No. 8,761,978 describes a propulsion system that includes an energy system, an auxiliary system, and a system controller. The energy system includes a bi-directional boost converter coupled to a direct current (DC) link and comprising a plurality of input channels. The energy system also includes a first energy storage device coupled to a first input channel of the bi-directional boost converter via a DC bus. The auxiliary system is coupled to the energy system and includes an auxiliary energy source, an auxiliary load, and an auxiliary load controller coupled to the auxiliary energy source and to the auxiliary load. The system controller is configured to cause the auxiliary load controller to reduce a power draw of the auxiliary load from the auxiliary energy source and to cause the bi-directional boost converter to boost a voltage supplied by the auxiliary energy source and to supply the boosted voltage to the DC link.

SUMMARY

This disclosure describes, among other things, an electrical architecture that allows power to be transferred to a battery powered machine while the machine is moving and that allows the machine to be charged while stationary.

In an aspect, this disclosure is directed to an electrical architecture for a battery powered machine that has at least two different voltage buses, the electrical architecture comprising: a battery module configured to supply a first voltage to a first voltage bus; an AC/DC converter circuit coupled to the first voltage bus and configured to charge the battery module while the battery powered machine is stationary; a first DC/DC converter circuit coupled between the first voltage bus and a second voltage bus, wherein the first DC/DC converter circuit is configured to generate a second voltage at the second voltage bus, and wherein the second voltage is different than the first voltage; and a second DC/DC converter circuit configured to be coupled between an external power source and the battery module, wherein the second DC/DC converter circuit is configured to receive power from the external power source and charge the battery module while the battery powered machine is in motion.

In another aspect, this disclosure is directed to a battery power machine comprising an electrical architecture for a battery powered machine that has at least two different voltage buses, the electrical architecture comprising: a battery module configured to supply a first voltage to a first voltage bus; an AC/DC converter circuit coupled to the first voltage bus and configured to charge the battery module while the battery powered machine is stationary; a first DC/DC converter circuit coupled between the first voltage bus and a second voltage bus, wherein the first DC/DC converter circuit is configured to generate a second voltage at the second voltage bus, and wherein the second voltage is different than the first voltage; and a second DC/DC converter circuit configured to be coupled between an external power source and the battery module, wherein the second DC/DC converter circuit is configured to receive power from the external power source and charge the battery module while the battery powered machine is in motion.

In yet another aspect, this disclosure is directed to a method of providing at least two different voltages for a battery powered machine, the method comprising: supplying, via a battery module, a first voltage to a first voltage bus; coupling an AC/DC converter circuit to the first voltage bus and charging the battery module while the battery powered machine is stationary; coupling a first DC/DC converter circuit between the first voltage bus and a second voltage bus; generating, via the first DC/DC converter circuit, a second voltage at the second voltage bus, wherein the second voltage is different than the first voltage; coupling a second DC/DC converter circuit between an external power source and the battery module; and charging, via the external power source, the battery module while the battery powered machine is in motion.

DETAILED DESCRIPTION

Large battery powered machines, such as mining trucks, require a large battery to provide a reasonable runtime for the machine. A large amount of power is needed to charge these large batteries. However, there can be concerns with current limits when providing such a large amount of power to charge these large batteries. To decrease current, the voltage can be increased, but that can introduce new requirements imposed by regulations.

The present inventors have recognized the need for an electrical architecture for a large battery powered machine that enables high rates of power transfer while also staying within component market and regulatory limitations. This disclosure describes, among other things, an electrical architecture that allows power to be transferred to a battery powered machine while the machine is moving and that allows the machine to be charged while stationary.

Figure 1:
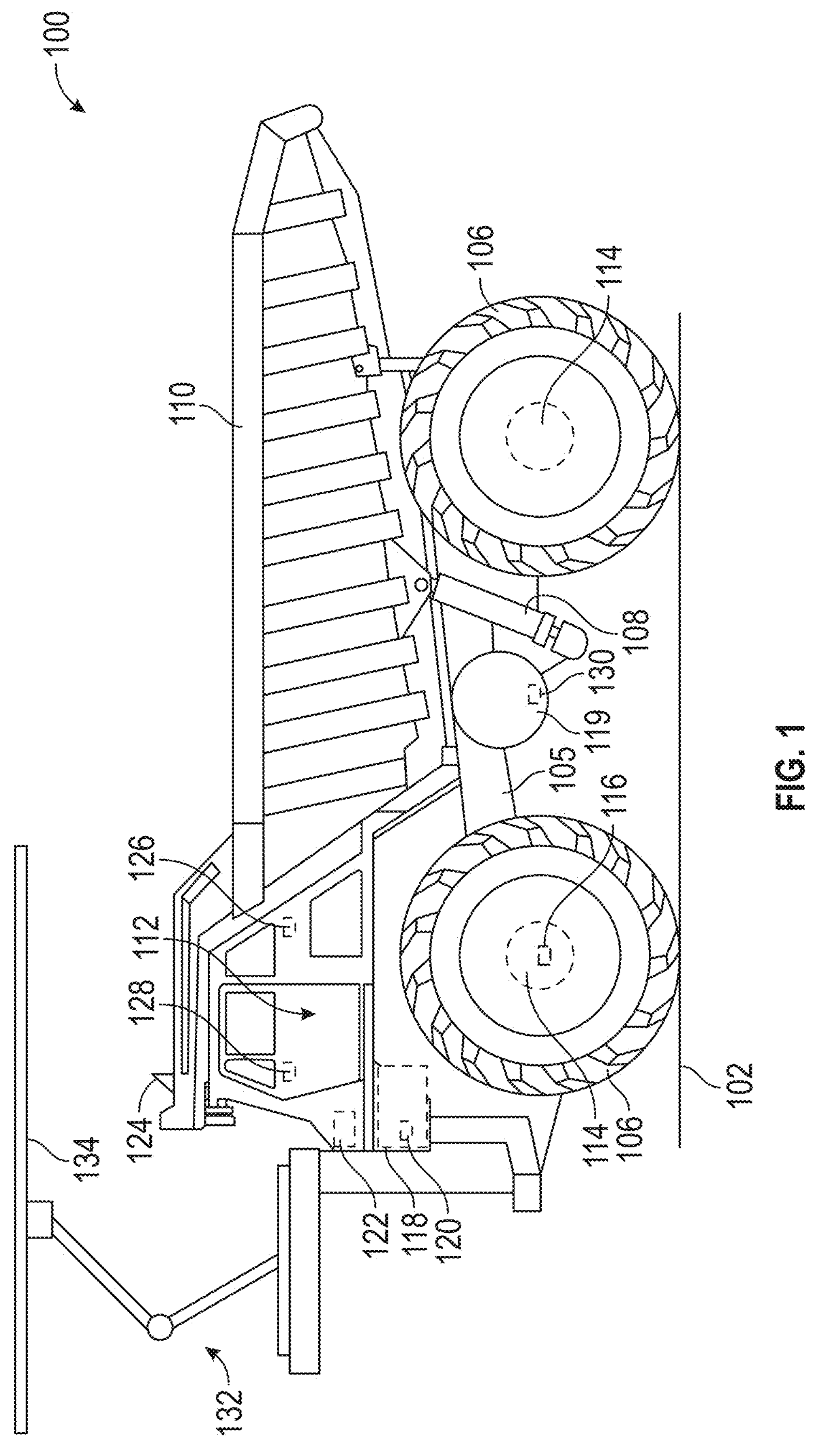
FIG. 1 is a perspective view of an example of a battery powered machine that can implement various techniques of this disclosure.

FIG. 1 is a perspective view of an example of a battery powered machine 100 that can implement various techniques of this disclosure. The battery powered machine 100, although depicted as a mining truck or surface haul truck, can be any suitable machine, such as any type of loader, dozer, dump truck, skid loader, excavator, compaction machine, backhoe, combine, crane, drilling equipment, tank, trencher, tractor, any suitable stationary machine, any variety of generator, locomotive, marine engines, combinations thereof, or the like. The presently disclosed subject matter is not limited to any particular platform of use and can be implemented across various types of vehicles, installations (i.e., non-vehicle uses), and the like. The battery powered machine 100 of FIG. 1 is merely for purposes of illustration.

As shown in FIG. 1, the battery powered machine 100 includes a frame 105 and wheels 106. The wheels 106 are mechanically coupled to a drive train (not shown) to propel the battery powered machine 100. When the wheels 106 of the battery powered machine 100 are caused to rotate, the battery powered machine 100 traverses the surface 102. Although illustrated in FIG. 1 as having a hub with a rubber tire, in other examples, the wheels 106 may instead be in the form of drums, chain drives, tracks, combinations thereof, or the like. The frame 105 of the battery powered machine 100 is constructed from any suitable materials, such as iron, steel, aluminum, other metals, ceramics, plastics, combination thereof, or the like. The frame 105 is of a unibody construction in some cases, and in other cases, is constructed by joining two or more separate body pieces. Parts of the frame 105 are joined by any suitable variety of mechanisms, including, for example, welding, bolts, screws, other fasteners, epoxy, combinations thereof, or the like.

The battery powered machine 100 may include a hydraulic system 108 that move a dump box 110 or other moveable elements configured to move, lift, carry, and/or dump materials. The dump box 110 is used, for example, to pick up and carry dirt or mined ore from one location on the surface 102 to another location of the surface 102. The dump box 110 is actuated by the hydraulic system 108, or any other suitable mechanical system. In some cases, the hydraulic system 108 is powered by an electric motor (not shown), such as by powering hydraulic pump(s) (not shown) of the hydraulic system 108. It should be noted that in other types of machines (e.g., machines other than a mining truck) the hydraulic system 108 may be in a different configuration than the one shown herein, may be used to operate elements other than a dump box 110, and/or may be omitted.

With continued reference to FIG. 1, the battery powered machine 100 also includes an operator station 112. The operator station 112 is configured to seat an operator (not shown) therein. The operator seated in the operator station 112 interacts with various control interfaces and/or actuators within the operator station 112 to control movement of various components of the battery powered machine 100 and/or the overall movement of the battery powered machine 100 itself. Thus, control interfaces and/or actuators within the operator station 112 allow the control of the propulsion of the battery powered machine 100 by controlling operation of one or more motors 114 that are electric motors, the motors 114 being controlled by a motor controller 116 and powered by a battery 118. The motor controller 116 may be controlled according to operator inputs received at the operator station 112. A battery controller 120 monitors and controls various aspects of the battery 118, such as controlling a temperature of the battery or preventing an over discharge condition.

The motors 114 may be of any suitable type, such as induction motors, permanent magnet motors, switched reluctance (SR) motors, combinations thereof, or the like. The motors 114 are of any suitable voltage, current, and/or power rating. The motors 114 when operating together are configured to propel the battery powered machine 100 as needed for tasks that are to be performed by the battery powered machine 100. For example, the motors 114 may be rated for a range of about 500 volts to about 3000 volts. The motor controller 116 include one or more control electronics to control the operation of the motors 114. In some cases, each motor 114 may be controlled by its own motor controller 116. In other cases, all the motors of the battery powered machine 100 may be controlled by a single motor controller 116. The motor controller 116 may further include one or more inverters or other circuitry to control the energizing of magnetic flux generating elements (e.g., coils) of the motors 114. The motors 114 are mechanically coupled to a variety of drive train components, such as a drive shaft and/or axles or directly to the wheels 106 to rotate the wheels 106 and propel the battery powered machine 100. The drivetrain includes any variety of other components including, but not limited to a differential, connector(s), constant velocity (CV) joints, etc.

Although not shown here, there may be one or more motors 114 that are not used for propulsion of the battery powered machine 100, but rather to operate pumps and/or other auxiliary components, such as to operate the hydraulic systems 108. According to examples of the disclosure, the power to energize the motors 114 is received from the battery 118. It should be noted that, in some cases, the battery 118 may provide power for operating the motors 114 and/or other power consuming components (e.g., controllers, cooling systems, displays, actuators, sensors, etc.) of the battery powered machine 100. As noted above, the presently disclosed subject matter is not limited solely to the use of battery power, as other forms of energy may be used in conjunction with the power provided by the battery 118, including, but not limited to, internal combustion engines or fuel cells.

The battery 118 may be of any suitable type and capacity. For example, the battery may be a lithium-ion battery, a lead-acid battery, an aluminum ion battery, a flow battery, a magnesium ion battery, a potassium ion battery, a sodium ion battery, a metal hydride battery, a nickel metal hydride battery, a cobalt metal hydride battery, a nickel-cadmium battery, a wet cell of any type, a dry cell of any type, a gel battery, combinations thereof, or the like. The battery 118 may be organized as a collection of electrochemical cells arranged to provide the voltage, current, and/or power requirements of the motors 114. In some cases, the energy capacity of the battery 118 relative to the energy available from a full fuel tank 119 may be in the range of about 0.2 to about 1.5. In other cases, the energy capacity of the battery 118 relative to the energy available from a full fuel tank 119 (which would be provided if battery powered machine 100 includes a combustion engine such as a reciprocating internal combustion engine or turbine (not shown)) may be in the range of about 0.5 to about 1.0 In still other cases, the energy capacity of the battery 118 relative to the energy available from a full fuel tank 119 may be in the range of about 0.7 to about 0.9. It should be understood that the aforementioned ratios are examples, and the disclosure contemplates the battery 118 energy capacity to the fuel tank 119 energy capacity ratios in ranges outside of the aforementioned ranges.

The battery powered machine 100 includes an engine control module (ECM) 122 that controls various aspects of the battery powered machine 100. The ECM 122 is configured to receive battery status (e.g., state-of-charge (SOC) or other charge related metrics) from the battery controller 120, fuel level from the fuel tank controller 130, operator signal (s), such as an accelerator signal, based at least in part on the operator's interactions with one or more control interfaces and/or actuators of the battery powered machine 100. In other cases, the ECM 122 may receive control signals from a remote-control system by wireless signals received via an antenna 124. The ECM 122 uses the operator signal(s), regardless of whether they are received from an operator in the operator station 112 or from a remote controller, to generate command signals to control various components of the battery powered machine 100. For example, the ECM 122 may control the motors 114 via the motor controller 116, the hydraulic system 108, and/or steering of the battery powered machine 100 via a steering controller 126. It should be understood that the ECM 122 may control any variety of other subsystems of the battery powered machine 100 that are not explicitly discussed here to provide the battery powered machine 100 with the operational capability discussed herein.

Figure 2:
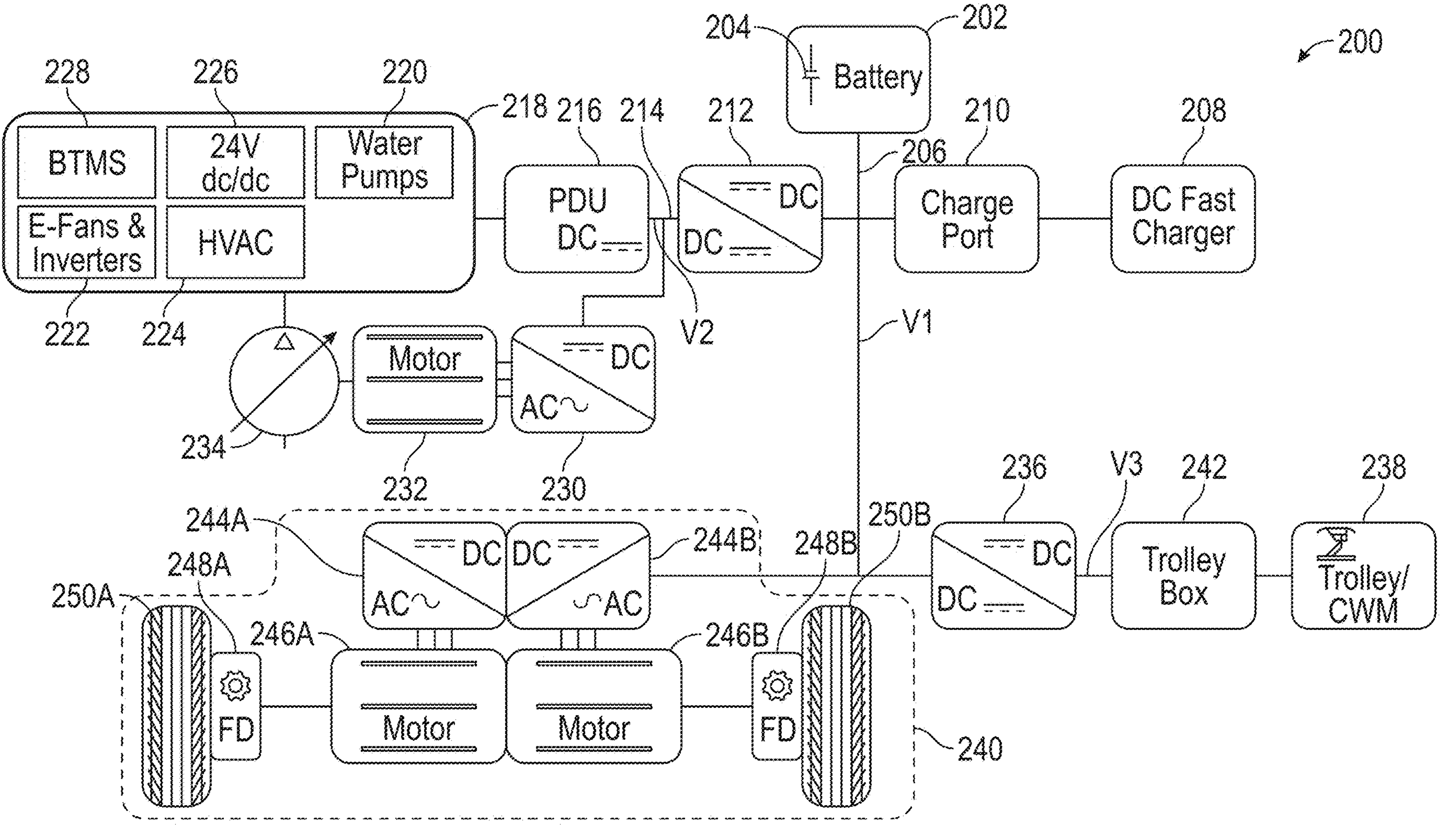
FIG. 2 is a block diagram of an example of an electrical architecture for providing electrical power to a battery powered machine that includes two different voltage buses.

FIG. 2 is a block diagram of an example of an electrical architecture 200 for providing electrical power to a battery powered machine, such as the battery powered machine 100 of FIG. 1, that includes two different voltage buses. The electrical architecture 200 is an example of the electrical architecture 112 of FIG. 1.

The electrical architecture 200 includes a rechargeable battery module 202 including one or more battery cells 204. The battery module 202 is configured to supply a first voltage V1 to a first voltage bus 206. For example, the battery module 202 can generate and supply a voltage greater than 700 volts (V) to the first voltage bus 206, such as 750V-1500V.

To charge the battery module 202, the electrical architecture 200 can include an AC/DC charger circuit 208, such as a fast-charging circuit that can charge the battery module 202 in 20-30 minutes, for example. To use the AC/DC charger circuit 208, the battery powered machine 100 needs to be taken out of service. The AC/DC charger circuit 208 is coupled, via a charge port 210, to the first voltage bus 206 and configured to charge the battery module 202 while the battery powered machine is stationary.

The electrical architecture 200 includes several DC/DC converters. A first DC/DC converter circuit 212 is coupled between the first voltage bus 206 and a second voltage bus 214. The first DC/DC converter circuit 212 is configured to generate a second voltage V2 at the second voltage bus 214, where the second voltage V2 is greater than 500V, such 550V-700V. The second voltage V2 is different than the first voltage V1. That is, the nominal voltage V2, e.g., 550V-700V, is different than the nominal voltage V1, e.g., 750V-1500V.

The second voltage bus 214 can be coupled to and supply power to, via a power distribution unit (PDU) 216, an accessories system 218 of the battery powered machine. The accessories system 218 can include one or more of a water pump 220, an electric fan 222, a heating, ventilation, and air conditioning (HVAC) system 224, a DC/DC converter 226, e.g., 24V, and a Battery Thermal Management System (BTMS) 228.

The second voltage bus 214 is also coupled, via a DC/AC converter circuit 230, to a motor 232. The motor 232 is coupled to a hydraulic pump 234, such as coupled to the dump bucket 102 of FIG. 1.

The electrical architecture 200 includes a second DC/DC converter circuit 236 configured to be coupled between an external power source 238 and the battery module 202. The second DC/DC converter circuit 236 is configured to receive power from the external power source 238 and charge the battery module 202 while the battery powered machine is in motion. The second DC/DC converter circuit 236 is configured to receive a third voltage V3 from the external power source 238. The external power source 238 can also power a traction system 240 to keep the battery powered machine in motion.

In some examples, the external power source 238 can be a trolley system that provides power to the electrical architecture 200 via overhead lines or other infrastructure, for example. The external power source 238 can provide a voltage greater than 2500V, such as 2700V-2800V. The second DC/DC converter circuit 236 can step down the voltage of the external power source 238 to match the voltage V1 of the first voltage bus 206.

The example shown in FIG. 2 includes a trolley box 242 coupled between the external power source 238 and the second DC/DC converter circuit 236. The trolley box 242 can include sensors and contactors, as well as reactors for filtering transients that can occur when there are multiple machines using the external power source 238.

The traction system 240 is coupled to and configured to receive power from the first voltage bus 206. The traction system 240 includes two DC/AC converter circuits 244A, 244B that provide power to corresponding motors 246A, 246B. The motors 246A, 246B are coupled to corresponding final drives 248A, 248B, such as 2-stage planetary final drives, that are, in turn, coupled to tires 250A, 250B via corresponding brakes (shown in FIG. 3).

Figure 3:
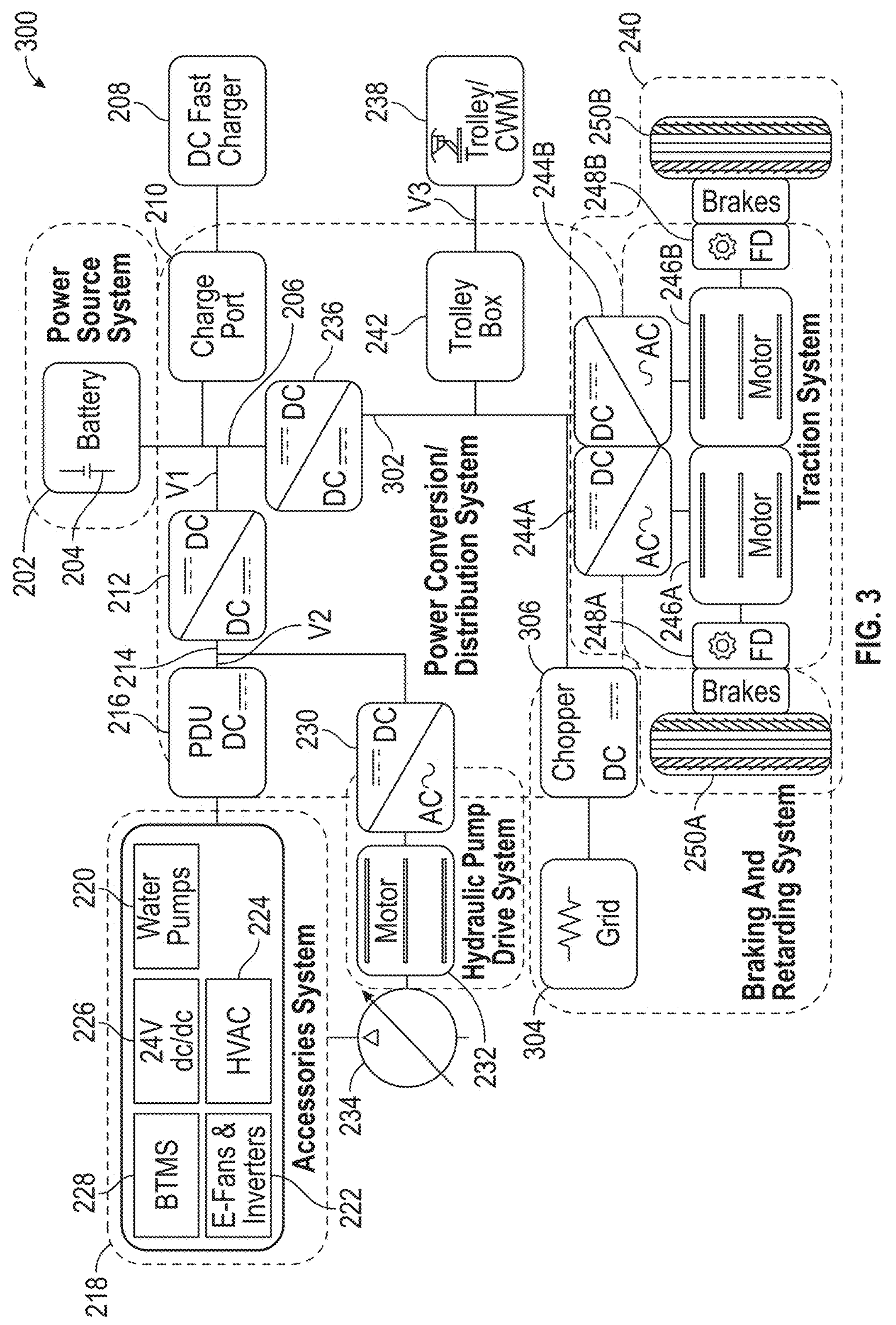
FIG. 3 is a block diagram of an example of an electrical architecture for providing electrical power to a battery powered machine that includes three different voltage buses.

FIG. 3 is a block diagram of another example of an electrical architecture 300 for providing electrical power to a battery powered machine, such as the battery powered machine 100 of FIG. 1, that includes three different voltage buses. The electrical architecture 300 is an example of the electrical architecture 112 of FIG. 1. Many of the components of the electrical architecture 300 are similar to the components of the electrical architecture 200 of FIG. 2 and, as such, use similar reference numbers. For purposes of conciseness, similar components will not be described in detail again.

The electrical architecture 300 of FIG. 3 includes a third voltage bus 302 configured to receive the third voltage V3 from the external power source 238. The third voltage V3 is different from both the first voltage V1 and the second voltage V2. That is, the nominal voltage V3, e.g., 2500V-2800V, is different than the nominal voltage V1, e.g., 750V-1500V, and the nominal voltage V2, e.g., 550V-700V. This is contrast to the electrical architecture 200 of FIG. 2, which has two voltage buses.

The second DC/DC converter circuit 236 is coupled between the third voltage bus 302 and the first voltage bus 206. The traction system 240 of the battery powered machine is coupled to the third voltage bus 302. This is in contrast to the electrical architecture 200 of FIG. 2 where the traction system 240 was coupled to the first voltage bus 206.

The electrical architecture 300 can include a braking and retarding system that includes a resistor grid 304 coupled to a chopper DC circuit 306. The resistor grid 304 and the chopper DC circuit 306 can dissipate regenerative power on the third bus 302 if the battery is full and cannot take the energy.

Figure 4:
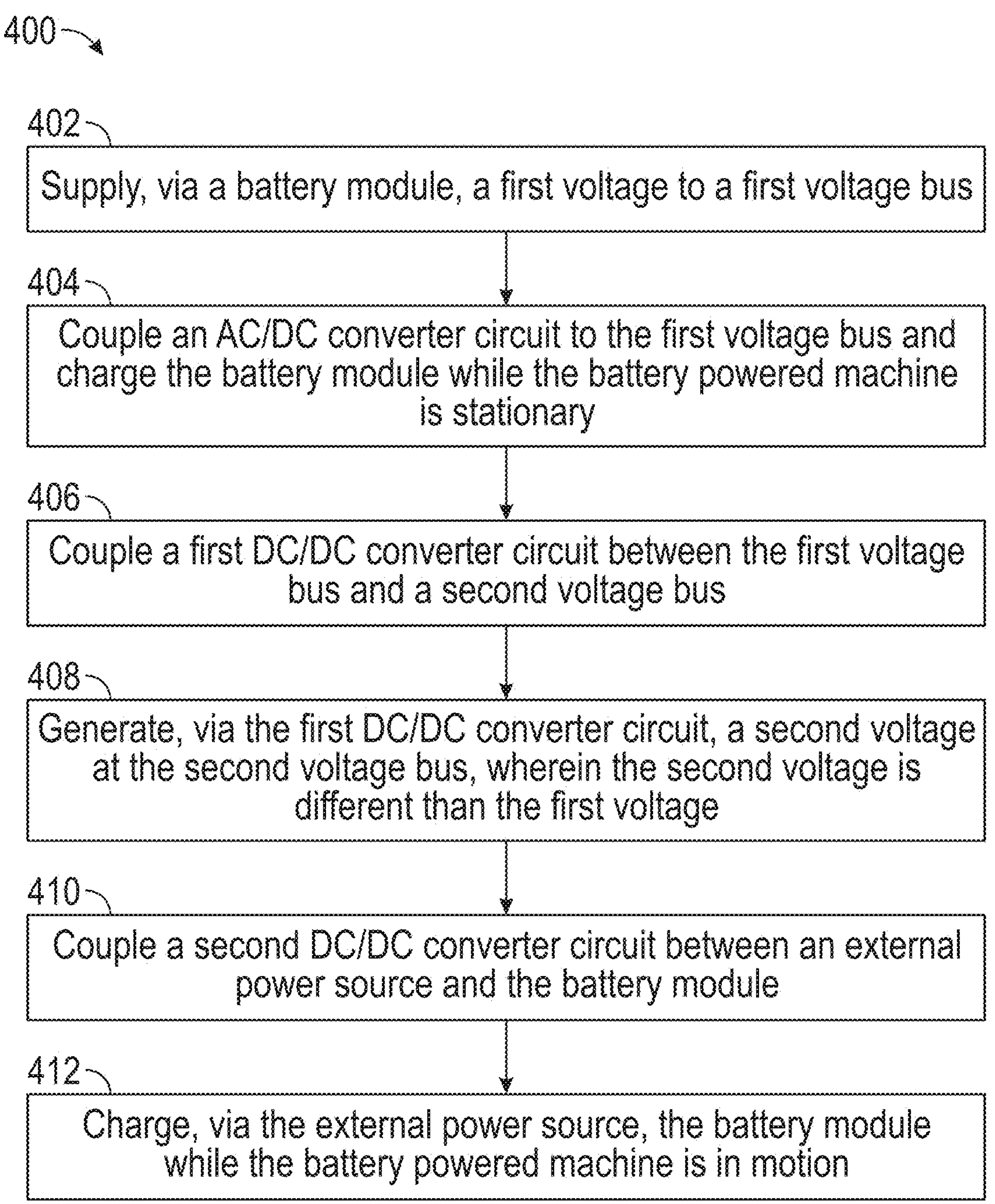
FIG. 4 is a flow diagram of an example of a method of providing at least two different voltages for a battery powered machine.

FIG. 4 is a flow diagram of an example of a method 400 of providing at least two different voltages for a battery powered machine. At block 402, the method 400 includes supplying, via a battery module, a first voltage to a first voltage bus. For example, the battery module 202 can supply a first voltage V1 to the first voltage bus 206 of FIGS. 2 and 3.

At block 404, the method 400 includes coupling an AC/DC converter circuit to the first voltage bus and charging the battery module while the battery powered machine is stationary. For example, the AC/DC charger circuit 208 of FIGS. 2 and 3 can be coupled to the first voltage bus 206 and can charge the battery module 202 while the battery powered machine, such as the battery powered machine 100 of FIG. 1, is stationary.

At block 406, the method 400 includes coupling a first DC/DC converter circuit between the first voltage bus and a second voltage bus. For example, the first DC/DC converter circuit 212 of FIGS. 2 and 3 can be coupled between the first voltage bus 206 and the second voltage bus 214, such as to provide power to the accessories system 218.

At block 408, the method 400 includes generating, via the first DC/DC converter circuit, a second voltage at the second voltage bus, wherein the second voltage is different than the first voltage. For example, the first DC/DC converter circuit 212 of FIGS. 2 and 3 can generate a second voltage V2 at the second voltage bus 214, where the nominal first voltage V1 is different from the nominal second voltage V2.

At block 410, the method 400 includes coupling a second DC/DC converter circuit between an external power source and the battery module. For example, the second DC/DC converter circuit 236 of FIGS. 2 and 3 can be coupled between an external power source 238, such as a trolley system, and the battery module 202.

At block 412, the method 400 includes charging, via the external power source, the battery module while the battery powered machine is in motion. For example, the external power source 238 can charge the battery module 202 of FIGS. 2 and 3 while the battery powered machine, such as the battery powered machine 100 of FIG. 1, is in motion.

The method 400 can optionally include coupling the battery module and a traction system to the first voltage bus.

The method 400 can optionally include receiving, via the second DC/DC converter circuit 236, a third voltage from the external power source.

The method 400 can optionally include receiving, via a third voltage bus, a third voltage from the external power source, wherein the third voltage is different from both the first voltage and the second voltage, coupling a traction system of the battery powered machine to the third voltage bus, and coupling the second DC/DC converter circuit between the third voltage bus and the first voltage bus.

The method 400 can optionally include coupling the second voltage bus to an accessories system of the battery powered machine.

The various coupling and supplying operations described above can be performed under the control of one or more machine controllers running suitable software to execute various commands of an operator.

INDUSTRIAL APPLICABILITY

Large battery powered machines, such as mining trucks, require a large battery to provide a reasonable runtime for the machine. A large amount of power is needed to charge these large batteries. However, there can be concerns with current limits when providing such a large amount of power to charge these large batteries. To increase power, the voltage can be increased, but that can run into regulatory issues.

The present inventors have recognized the need for an electrical architecture for a large battery powered machine that enables high rates of power transfer while also staying within component market and regulatory limitations. This disclosure describes, among other things, an electrical architecture that allows power to be transferred to a battery powered machine while the machine is moving and that allows the machine to be charged while stationary.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

The above detailed description is intended to be illustrative, and not restrictive. The scope of the disclosure should, therefore, be determined with references to the appended claims, along with the full scope of equivalents to which such claims are entitled.

What is claimed is:

1. An electrical architecture for a battery powered machine that has at least two different voltage buses, the electrical architecture comprising:

- a battery module configured to supply a first voltage to a first voltage bus;
- an AC/DC converter circuit coupled with the first voltage bus and configured to charge the battery module via a charge port while the battery powered machine is stationary;
- a first DC/DC converter circuit coupled between the first voltage bus and a second voltage bus, wherein the first DC/DC converter circuit is configured to generate, from the first voltage at the first voltage bus, a second voltage at the second voltage bus, and wherein the second voltage is less than the first voltage;
- a second DC/DC converter circuit configured to be coupled between the first voltage bus and a third voltage bus, wherein the second DC/DC converter circuit is configured to generate, from the first voltage at the first voltage bus, a third voltage at the third voltage bus, wherein the third voltage is greater than the first voltage and the second voltage, wherein the second DC/DC converter circuit is further configured to be coupled between the battery module and an external power source comprising a trolley system or charging-while-moving system, and wherein the external power source is configured to provide power, while the battery powered machine is in motion, to a traction system at the third voltage, and wherein the external power source is configured to charge the battery module via the second DC/DC converter circuit while the battery powered machine is in motion;

an accessories system coupled with the second voltage bus, wherein the accessories system includes at least one accessory device and a third DC/DC converter circuit; and the third DC/DC converter circuit coupled with the second voltage bus and configured to generate, from the second voltage at the second voltage bus, a fourth voltage, wherein the fourth voltage is supplied to the at least one accessory device, and wherein the fourth voltage is less than the first voltage, the second voltage, and the third voltage.

2. The electrical architecture of claim 1, further comprising:

filtering and sensing circuitry configured to be coupled between the external power source and the third voltage bus.

3. The electrical architecture of claim 1, wherein the accessories system includes one or more of a water pump, an electric fan, or a heating, ventilation, air conditioning (HVAC) system.

4. The electrical architecture of claim 1, wherein the first voltage is greater than 900V, wherein the second voltage is greater than 500V, and wherein the third voltage is greater than 1500V.

5. The electrical architecture of claim 1, further comprising:

a hydraulic pump drive system including a motor coupled with a hydraulic pump; and a DC/AC converter circuit coupled between the second voltage bus and the motor.

6. The electrical architecture of claim 1, wherein the traction system is coupled with the third voltage bus.

7. The electrical architecture of claim 1, further comprising:

a braking and retarding system coupled with a chopper DC circuit, wherein the chopper DC circuit is coupled with the third voltage bus.

8. An electrical architecture for a battery powered machine that has at least two different voltage buses, the electrical architecture comprising:

a battery module configured to supply a first voltage to a first voltage bus;

an AC/DC converter circuit coupled with the first voltage bus and configured to charge the battery module via a charge port while the battery powered machine is stationary;

a first DC/DC converter circuit coupled between the first voltage bus and a second voltage bus, wherein the first DC/DC converter circuit is configured to generate, from the first voltage at the first voltage bus, a second voltage at the second voltage bus, and wherein the second voltage is different than the first voltage;

a second DC/DC converter circuit configured to be coupled between the first voltage bus and a third voltage bus, wherein the second DC/DC converter circuit is configured to generate, from the first voltage at the first voltage bus, a third voltage at the third voltage bus, and wherein the third voltage is different than the first voltage and the second voltage;

an accessories system coupled with the second voltage bus, wherein the accessories system includes at least one accessory device and a third DC/DC converter circuit;

the third DC/DC converter circuit coupled with the second voltage bus and is configured to generate, from the second voltage at the second voltage bus, a fourth voltage, and wherein the fourth voltage is supplied to the at least one accessory device; and filtering and sensing circuitry configured to be coupled between an external power source including a trolley system or charging-while-moving (CWM) system and the third voltage bus, wherein the second DC/DC converter circuit is configured to receive power from the external power source and charge the battery module while the battery powered machine is in motion, and wherein the external power source is configured to provide power to a traction system at the third voltage while the battery powered machine is in motion.

9. The electrical architecture of claim 8, wherein the accessories system includes one or more of a water pump, an electric fan, or a heating, ventilation, air conditioning (HVAC) system.

10. The electrical architecture of claim 8, wherein the first voltage is greater than 900V, wherein the second voltage is greater than 500V, and wherein the third voltage is greater than 1500V.

11. The electrical architecture of claim 8, further comprising:

a hydraulic pump drive system including a motor coupled with a hydraulic pump; and a DC/AC converter circuit coupled between the second voltage bus and the motor.

12. The electrical architecture of claim 8, wherein the traction system is coupled with the third voltage bus.

13. The electrical architecture of claim 8, further comprising:

a braking and retarding system coupled with a chopper DC circuit, wherein the chopper DC circuit is coupled with the third voltage bus.

14. An electrical architecture for a battery powered machine that has at least two different voltage buses, the electrical architecture comprising:

a battery module configured to supply a first voltage to a first voltage bus;

an AC/DC converter circuit coupled with the first voltage bus and configured to charge the battery module via a charge port while the battery powered machine is stationary;

a first DC/DC converter circuit coupled between the first voltage bus and a second voltage bus, wherein the first DC/DC converter circuit is configured to generate, from the first voltage at the first voltage bus, a second voltage at the second voltage bus, and wherein the second voltage is different than the first voltage;

a second DC/DC converter circuit configured to be coupled between the first voltage bus and a third voltage bus, wherein the second DC/DC converter circuit is configured to generate, from the first voltage at the first voltage bus, a third voltage at the third voltage bus, wherein the third voltage is different than the first voltage and the second voltage, wherein the first voltage is greater than 900V, wherein the second voltage is greater than 500V, and wherein the third voltage is greater than 1500V;

an accessories system coupled with the second voltage bus, wherein the accessories system includes at least one accessory device and a third DC/DC converter circuit, wherein the accessories system includes one or more of a water pump, an electric fan, or a heating, ventilation, air conditioning (HVAC) system;

a power distribution unit coupled between the second voltage bus and the accessories system;

the third DC/DC converter circuit coupled with the third voltage bus and is configured to generate, from the second voltage at the second voltage bus, a fourth voltage, and wherein the fourth voltage is supplied to the at least one accessory device;

filtering and sensing circuitry configured to be coupled between an external power source including a trolley system or charging-while-moving (CWM) system and the third voltage bus, wherein the second DC/DC converter circuit is configured to receive power from the external power source and charge the battery module while the battery powered machine is in motion, and wherein the external power source is configured to provide power to a traction system at the third voltage while the battery powered machine is in motion;

a braking and retarding system including a resistor grid, wherein the braking and retarding system is coupled with a chopper DC circuit, wherein the chopper DC circuit is coupled with the third voltage bus, wherein the chopper DC circuit and resistor grid are configured to dissipate regenerative power;

a hydraulic pump drive system including a hydraulic pump motor coupled with a hydraulic pump;

a DC/AC converter circuit coupled between the second voltage bus and the hydraulic pump motor; and the traction system including:

first and second traction system motors;

first and second DC/AC converters coupled with the first and second traction system motors.

* * * * *